United States Patent [19]
Strong

[11] Patent Number: 5,083,528
[45] Date of Patent: * Jan. 28, 1992

[54] AQUARIUM ASSEMBLY

[75] Inventor: Finn A. Strong, Chatham, Mass.

[73] Assignee: Finn Strong Designs Inc., East Greenwich, R.I.

[*] Notice: The portion of the term of this patent subsequent to Apr. 9, 2008 has been disclaimed.

[21] Appl. No.: 672,325

[22] Filed: Mar. 20, 1991

Related U.S. Application Data

[63] Continuation-in-part of Ser. No. 552,104, Jul. 13, 1990, Pat. No. 5,005,521.

[51] Int. Cl.⁵ .......................................... A01K 63/00
[52] U.S. Cl. ..................................... 119/5; 239/D23; D30/105
[58] Field of Search ........................ 119/5, 4, 3; D30/101–107; 239/17–23

[56] References Cited

U.S. PATENT DOCUMENTS

| 3,122,126 | 2/1964 | Yamada | 119/5 |
| 4,351,270 | 9/1982 | Sabin | 119/5 |
| 4,836,142 | 6/1989 | Duback | 119/5 |
| 5,005,521 | 4/1991 | Strong | 119/5 |

Primary Examiner—John G. Weiss
Attorney, Agent, or Firm—Salter & Michaelson

[57] ABSTRACT

A wall-mounted aquarium assembly comprising a plurality of discreet tanks in stepped, gradually descending relation whereby water introduced to the uppermost tank flows therethrough and then down into and through each succeeding tank. Means are provided for channeling the flow of water from one tank to the next.

8 Claims, 5 Drawing Sheets

AQUARIUM ASSEMBLY

This application is a continuation-in-part of application Ser. No. 07/552,104, filed July 13, 1990.

BACKGROUND OF THE INVENTION

The present invention relates generally to a novel aquarium system comprising a plurality of independent and discrete tanks mounted, preferably on a wall surface, in stepped, gradually descending relation whereby water introduced to the uppermost tank flows therethrough and then down into and through each succeeding tank. After the water exits from the lowermost tank, filter and pump means cleanse and recirculate the water for reintroduction to the uppermost tank.

Aquariums and/or fish tanks have long been used in homes, offices, and the like, both for their decorative and ornamental functions, and for providing means whereby various types of fish may be viewed swimming, feeding, and engaging in other activities which are interesting to watch. The characteristics and tendencies of specific fish can be of extreme interest as the fish grow, and when viewed at periodic intervals.

It is also known to provide a plurality of independent tanks in stepped, gradually descending relation with means for filtering and recirculating water exiting from the lowermost tank so that the cleansed water may be reintroduced to the uppermost tank. The patent to YAMADA 3,122,126 dated Feb. 25, 1964 teaches such an arrangement, although the YAMADA patent is for use in fish farming and hence differs in many significant respects from the type of recreational aquarium with which the instant invention is concerned.

SUMMARY OF THE INVENTION

The basic object of the present invention is to provide an aquarium system comprising a plurality of discrete, independent tanks, preferably wall-mounted, wherein all of the tanks have identical inlet sections and identical outlet flumes, with said inlet sections and outlet flumes having complementary and cooperating connecting means whereby the outlet flume of one tank may be releasably interengaged with the inlet section of the next adjacent tank in order to maintain adjacent tanks releasably interconnected to each other, and at the same time permitting water to flow from one tank to the next. Since adjacent tanks are easily connectable and disconnectable from each other, this permits the system to be quickly and easily disassembled, such as when it is desired to clean or replace individual tanks, and also permits the tanks to be assembled in any desired order or sequence should it become desirable to rearrange the specific location of individual tanks in the system for aesthetic reasons or otherwise.

It is a further object of this invention to provide a specially designed switch-back tank which reverses the direction of flow of the water. Thus a first group of tanks may be mounted in stepped, gradually descending relation with the lowermost tank in the group being the switch-back tank, and then a second group of stepped, gradually descending tanks may extend from the switch-back tank in the opposite direction in order to provide a unique system comprising a plurality of tanks extending downwardly in one direction and then a second plurality of tanks extending downwardly in the opposite direction.

Another object is to provide a specially designed corner tank adapted to be mounted in the corner of a room whereby one group of stepped, gradually descending tanks extend along one wall of the room into engagement with the corner tank, and then a second group of stepped, downwardly descending tank extend from the corner tank along a second wall extending angularly from the first wall.

Another feature of my invention is the construction of the individual tanks. Specifically, each tank, excluding the switch-back tank and the corner tank, comprise a pair of generally parallel side walls, at least one of which is transparent, with a base member mounted therebetween and sealingly engaged with each wall. The base member is of undulating configuration so as to provide an interesting path for the flow of water through the tank, and includes one or more downwardly extending pockets or reservoirs where pools of water may accumulate, it being understood that the configuration of the base member in different tanks may vary from tank to tank so as to provide more interesting visual effects and a continually changing environment for the fish as they swim from tank to tank. Although the design and configuration of the base member may vary from tank to tank and, in fact, the tanks themselves may be of different sizes and shapes, the one thing that is common is that all the base members have an identical inlet section and they all have an identical outlet flume, said inlet sections and flumes being provided with complementary, cooperating connecting means whereby the flume of one tank may be releasably interengaged with the inlet section of the next adjacent tank to releasably interconnect adjacent tanks to each other and at the same time to provide a smooth spillway from one tank to the next over which the water may flow as it exits from one tank and enters the next succeeding tank. In this way, the orientation and order of the tanks can be varied to create numerous different visual combinations.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
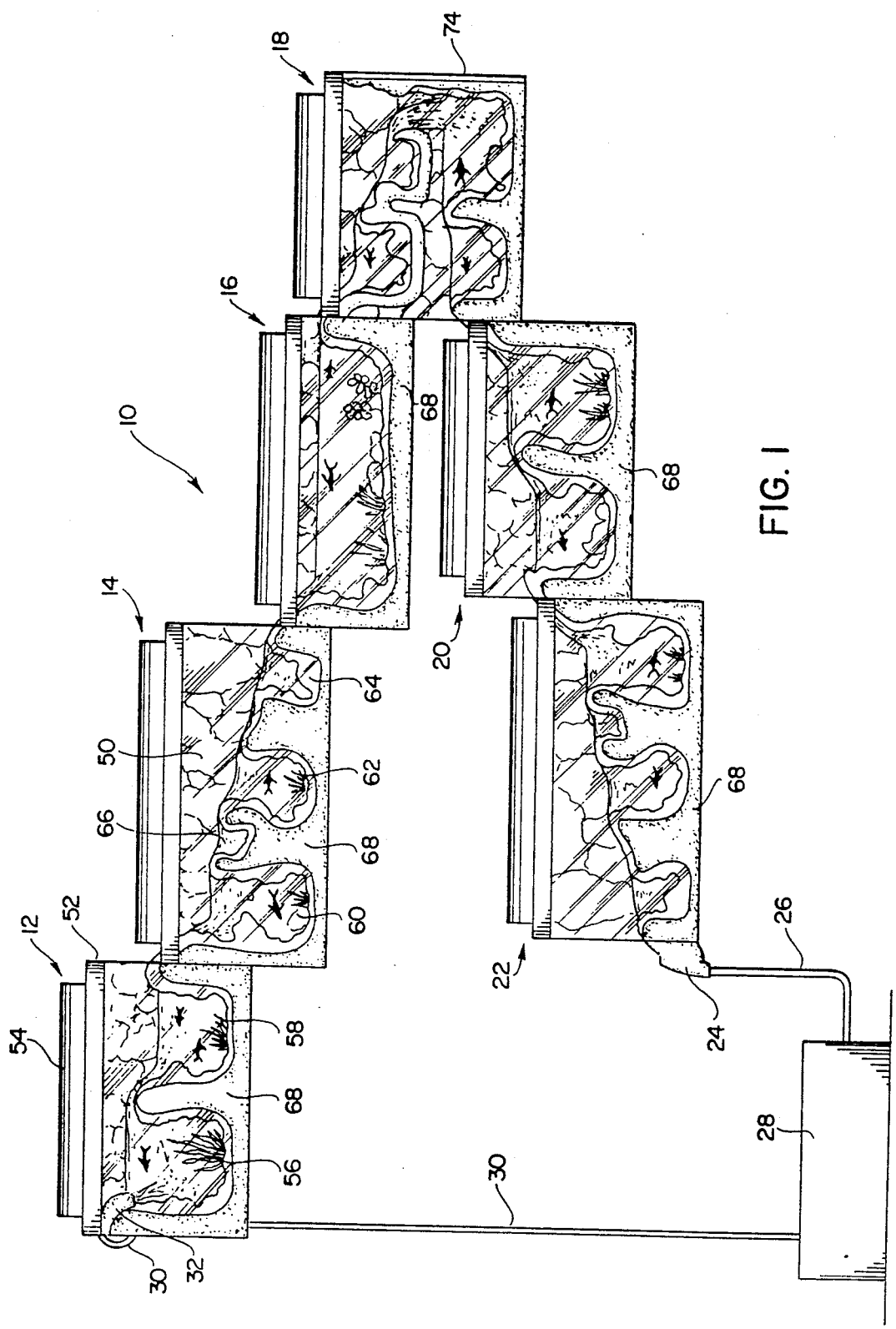
FIG. 1 is a side elevational view of an aquarium assembly embodying the present invention.

Referring to the drawings, and particularly FIG. 1 thereof, an aquarium assembly is shown generally at 10 comprising a plurality of independent discrete tanks 12, 14 and 16 mounted, preferably to a wall surface by any suitable wall hanging means (not shown), in stepped, gradually descending relation. Attached to the downstream end of the tank 16 is a switch-back tank 18 which reverses the flow of the water by means hereinafter to be described so that the water flows in the opposite direction through tanks 20 and 22. Water exiting from the lowermost tank 22 passes through a recirculating manifold 24 to a conduit 26 and then to a conventional filter and recirculating pump shown at 28 14 which pumps the cleansed water upwardly through conduit 30 until it is reintroduced to tank 12 as at 32.

Figure 2:
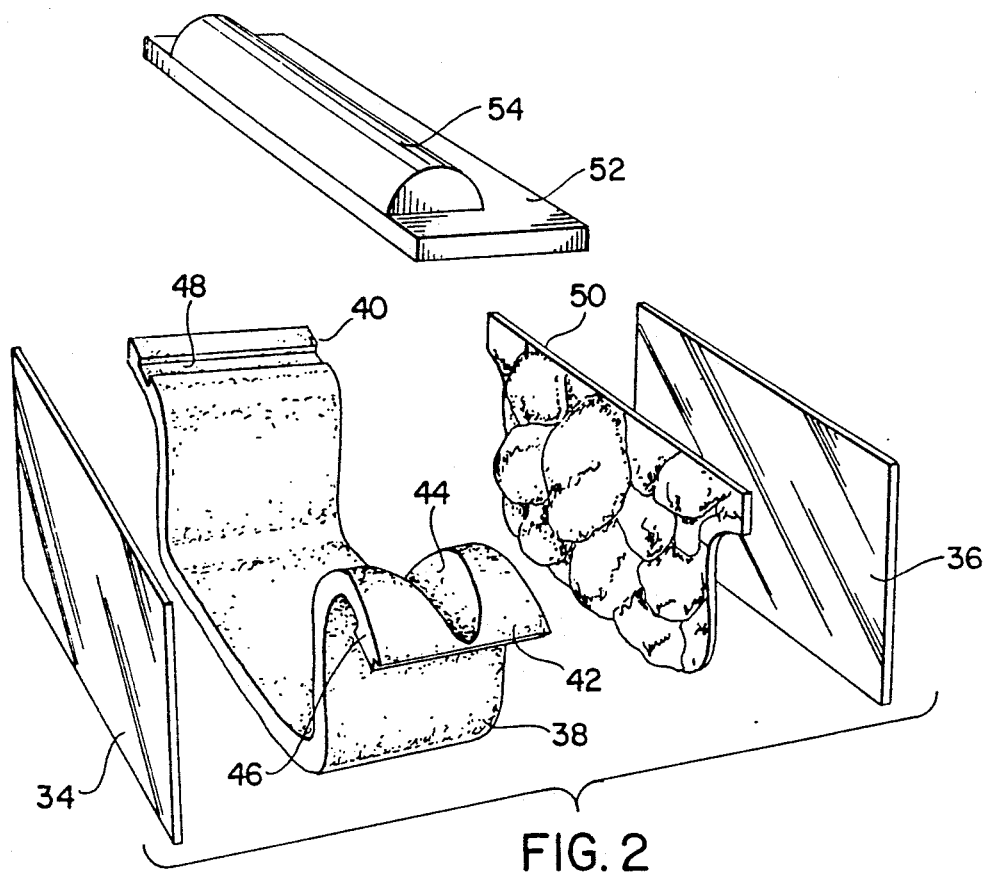
FIG. 2 is an exploded perspective view showing the component parts of one of the regular tanks of the system.
Figure 4:
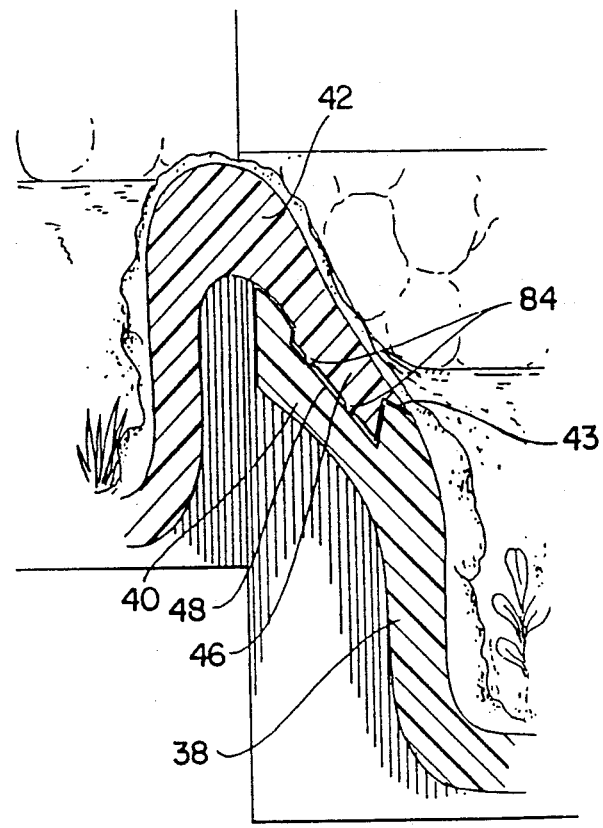
FIG. 4 is an elevational view, in section, showing the interengagement between the outlet flume of one tank and the inlet section of the next adjacent tank.

As will be seen most clearly in FIG. 2, the structural components of the tank 12, 14, 16, 20 and 22 comprise a pair of generally parallel side walls 34, 36, and since in the embodiment illustrated the wall 34 is the wall through which the tank is viewed, this wall at least is transparent. Since the wall 36 will be positioned against the wall surface on which the aquarium assembly is mounted, it is not necessary that the wall 36 be transparent, although for simplicity of manufacture, both the walls 34, 36 are preferably constructed of any suitable transparent plastic material. A base member 38 is mounted between the walls 34, 36 and is sealingly secured thereto by any suitable means, such as a suitable adhesive, it being understood that sealing gaskets (not shown) may be employed to effect the desired watertight seal between the side edges of base member 38 and side walls 34, 36. The base member 38, which preferably is made of molded plastic, such as fiberglass, is an elongated undulated strip comprising an inlet section 40 at one extremity and an outlet flume 42 at the opposite extremity. As will be noted, the flume 42 is provided on its upper surface with a channel 44 and on its bottom surface with a male connecting member 46. The inlet section 40 is provided on its upper surface with a female connecting portion 48 which is complementary in configuration to the male portion 46 so that the male portion of the flume of one tank may be releasably interengaged with the female portion of the inlet section of the next adjacent tank to releasably interconnect one tank 13 to the next in closely abutting relation, and at the same time to provide a smooth, continuous spillway over which water may flow from one tank to the next, as clearly shown in FIG. 4. For ornamental purposes, and in order to provide the fish with a more natural habitat, plate 50, which may simulate a rock formation or any other underwater scene, is slidably positioned between base member 38 and wall 36, it being seen that the member 50 is contoured so as to fit snugly within the configuration of member 38. The plate 50 may be frictionally maintained in its desired position abutting wall 36, or it may be secured thereto by any suitable adhesive or the like. Finally, a translucent top wall 52 is positioned over the tank in engagement with the top edges of side walls 34, 36, said wall 52 having thereon lighting means 54 which may be connected to a power source (not shown) by any suitable electrical cord and/or plug (also not shown). The purpose of the lighting means 54 is, of course, to illuminate the interior of the tank.

It will be understood that the configuration of each base member 38 differs from tank to tank and, in fact, as will be seen most clearly in FIG. 1, the precise size and shape of each of the tanks differs from each other. The base member 38 shown in FIG. 2 is the base member that forms a part of the tank 16, it being understood that the base member of the other tanks is exactly the same insofar as the inlet section and outlet flume are concerned, but differs in the precise undulation and configuration that are utilized. Thus, as will be seen in FIG. 1, the base member in tank 12 is undulated to define two pools 56, 58, while the undulations in the base member in tank 14 provide three pools 60, 62, and 64 and a mini pool 66. In the assembly illustrated in FIG. 1, the base member in tank 20 is generally similar to the base member in tank 12, while the base member in tank 22 is generally similar to the base member in tank 14. It will be understood, however, that any desired configuration and series of undulations may be provided in each base member, the only critical factor being that the inlet section and outlet flume of each base member must be identical sc as to permit the aforesaid interengagement between the flume of any desired tank with the inlet section of any other desired tank. For aesthetic purposes, the wall 34 of each tank is frosted or sandblasted as at 68 so that when the tanks are viewed through the walls 34, the walls will be opaque so as to obscure the areas located beneath the base members 38. Thus, when viewing the tanks through the walls 34, one sees only the water flow and the areas where water has accumulated, and, of course, the fish swimming therein, as well as the ornamental surface of plate 50.

Figure 3:
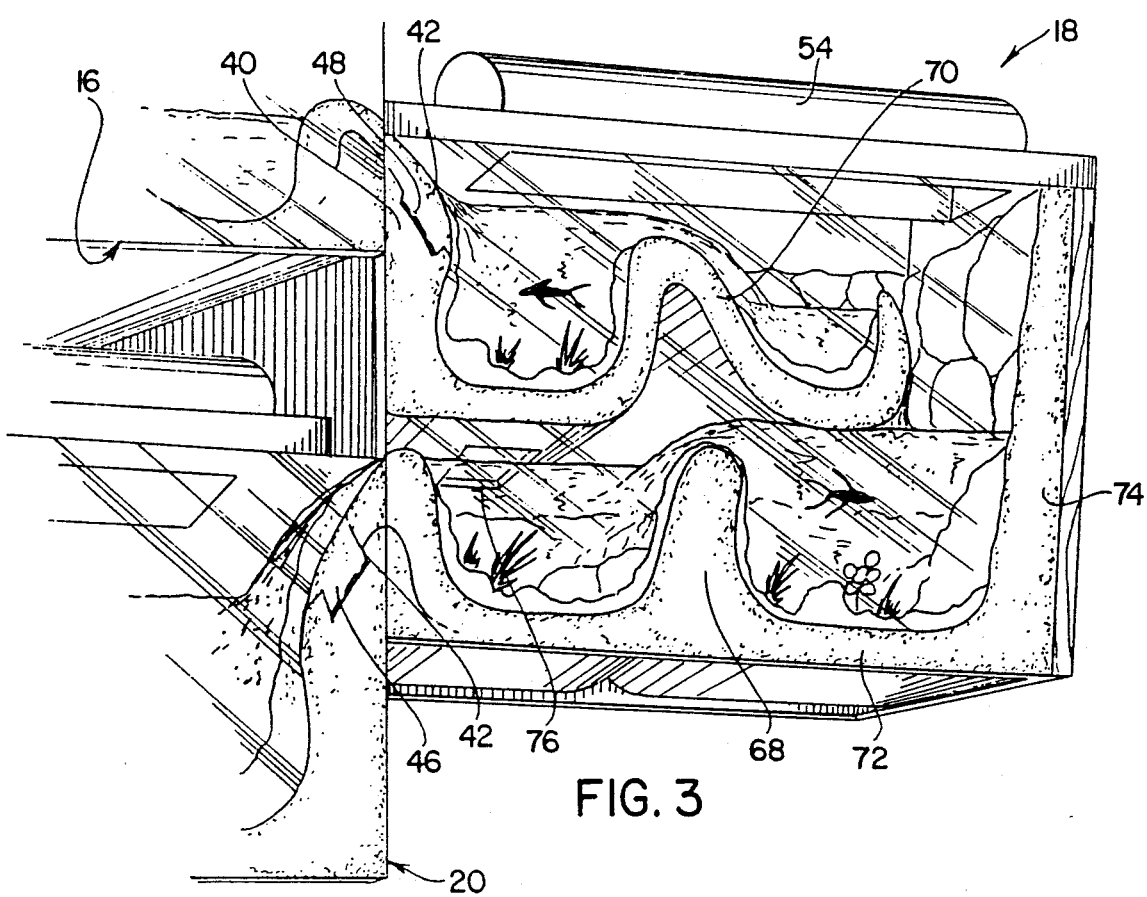
FIG. 3 is a fragmentary perspective showing the construction of the switch-back tank and its connection to its adjacent upstream and downstream tanks.

Although it will be understood that the assembly 10 shown in FIG. 1 may comprise nothing more than a series of stepped, downwardly descending tanks, all of which extend in one direction, in order to promote greater visual interest, the assembly 10 has been provided with a switch-back tank 18 which reverses the direction of the water flow so that the flow of water through tanks 20 and 22 is in a direction opposite to the downstream flow of water through tanks 12, 14, and 16. Switch-back tank 18 is shown in more detail in FIG. 3, and although it comprises the same general tank components as shown in FIG. 2, there are several differences. First of all, there is an upper base member 70 and a lower base member 72. The upper base member 70 has the same inlet section 40 and female portion 48 as do the other base members 38 so that the flume 42 of tank 16 may interengage therewith as previously described. The lower 17 base member 72 has the same outlet flume 42 and male portion 46 as previously described, but it will be noted that the outlet flume is located at the same end of the tank as inlet section 40. The opposite end of the tank is provided with an end wall 74, and it is important to note that upper base member 70 terminates in spaced relation to said end wall and/or in spaced relation to side wall 36 at the base member's terminal end portion, whereby water flowing into switch-back tank 18 from tank 16 flows through and over base member 70, and then at the terminal end of the latter there is space for the water to drop downwardly onto lower base member 72, whereupon the water eventually flows outwardly over flume 42 into tank 20. In order to provide sufficient illumination to the lower base member 72, one or more windows 76 are provided in base member 70 so that the illumination from lighting means 54 can pass downwardly through base member 70 to the area therebelow.

Figure 7:
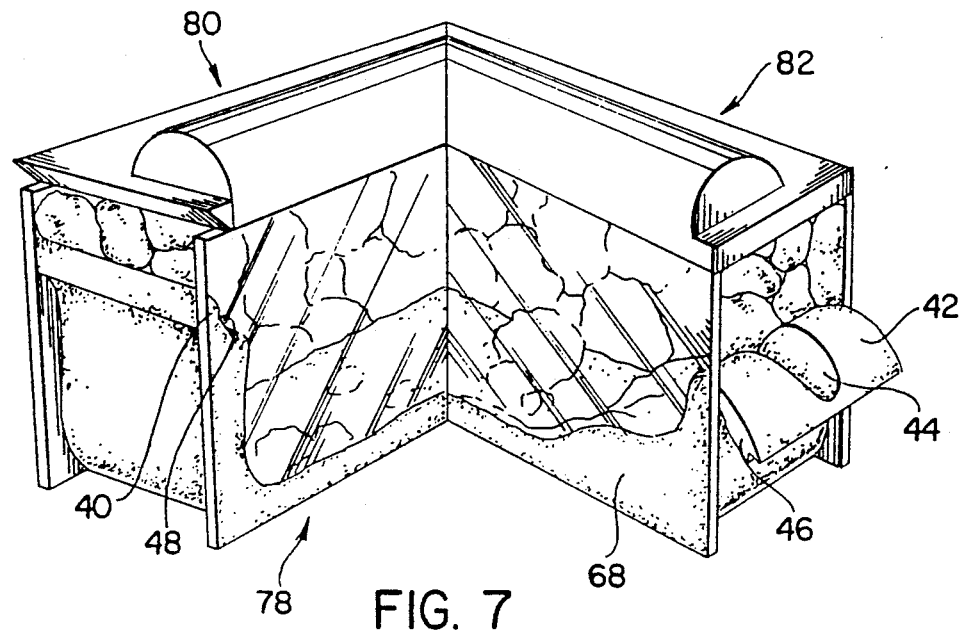
FIG. 7 is a perspective view of a corner tank that may be used in the instant assembly.

Another interesting visual arrangement of the tanks is to have the tanks extend around the corner of a room from one wall to the next. In order to achieve this, a special corner tank is utilized, as shown generally at 78 in FIG. 7. The tank 78 has a first compartment 80 and a second compartment 82 extending angularly therefrom. The tank 80 has the same construction as the tank illustrated in FIG. 2, and specifically has the identical inlet section 40 and female connector 48. The second compartment 82 is also of the same construction and has at its exit end the identical outlet flume 42 and male connector 46. Thus, a series of stepped, descending tanks similar to the tanks 12, 14 and 16 in FIG. 1 may interconnect with compartment 80 of corner 16 tank 78 along one wall surface, and then a second series of similar tanks interconnect with flume 42 of compartment 82 and extend downwardly in stepped, gradually descending relation along the adjacent perpendicularly disposed wall surface. Thus, corner tank 78 is actually structurally similar to the tanks 12, 14, 16, 20 and 22 except that it has first and second compartments extending angularly with respect to each other, whereas said other tanks are uniplanar.

Referring again to FIG. 4, it will be noted that male connecting portion 46 is provided with a plurality of small protuberances 84, the purpose of which is to keep the abutting surfaces of inlet section 40 and flume 42 in slightly spaced relation. The reason for this is that it has been found that where these portions are in snug engagement with each other, there is a tendency, due to the phenomenon of osmosis, for water to seep down into and then upwardly between these surfaces and possibly out between the junction between the two adjacent tanks. However, by maintaining these surfaces in slightly spaced relation, this upward seepage is avoided.

Figure 5:
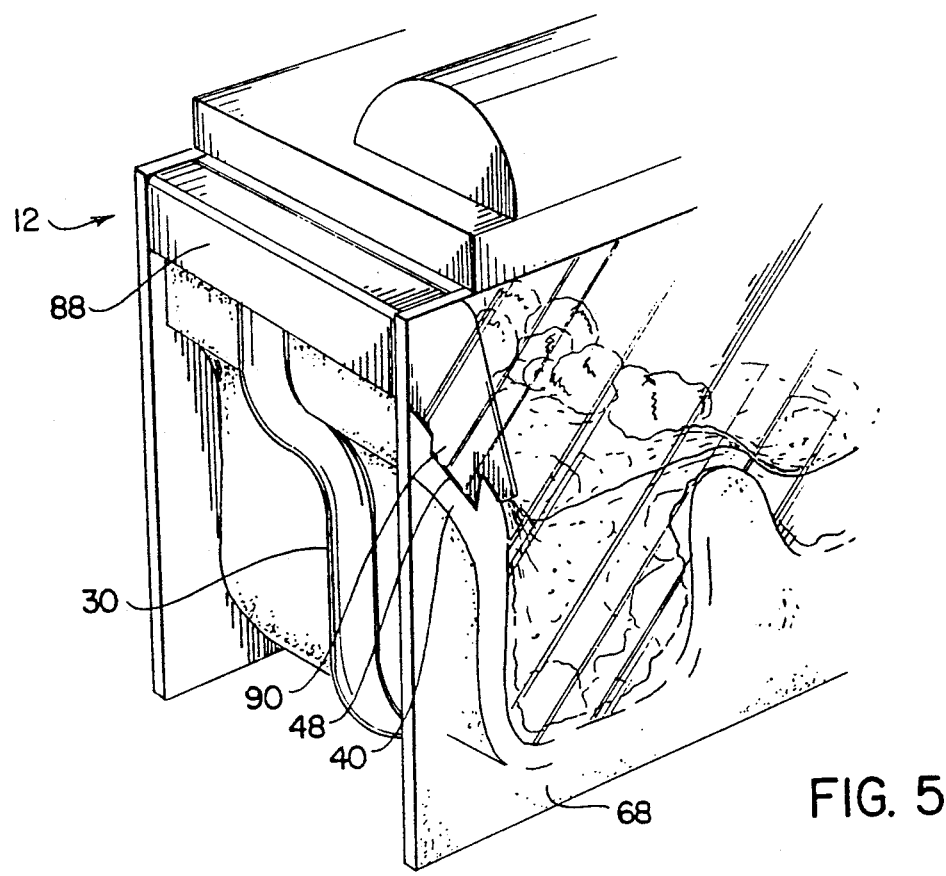
FIG. 5 is a fragmentary perspective view showing the means by which water is recirculated to the uppermost tank.
Figure 6:
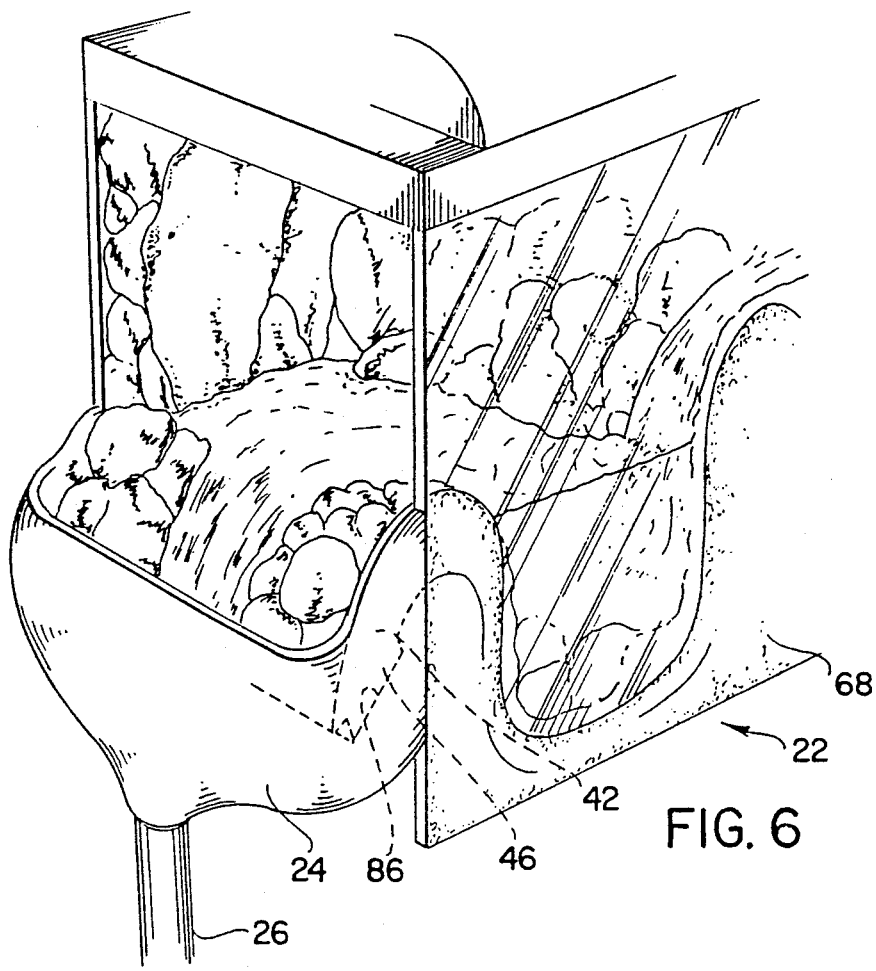
FIG. 6 is a fragmentary perspective view showing the recirculating manifold interengaged with the lowermost tank.

As hereinbefore stated, no matter what arrangement of tanks is employed, the lowermost tank in the series is connected to a recirculation conduit 26 so that water exiting from said lowermost tank can be filtered and recirculated by pump means for introduction to the uppermost tank in the series. FIG. 6 illustrates how recirculation manifold 24 is releasably connected to flume 42 of said lowermost tank, and specifically the manifold is provided with a female connecting portion 86 which releasably interengages with male portion 46 of flume 42 in generally the same manner as the inlet sections 40 releasably interengage therewith. The water flowing outwardly from tank 22 over flume 42 flows through manifold 24 into conduit 26 from whence it flows into the filter and pump means 28 for recirculation through conduit 30 to uppermost tank 12. FIG. 5 most graphically illustrates the connection of conduit 30 to the tank 12, it being noted that the water flows from conduit 30 into a manifold portion 88 which is provided with a male connecting portion 90 that releasably interconnects with female portion 48 of inlet section 40 in the same manner as the flumes 42 interconnect therewith.

Thus it will be seen that the releasable interconnection between the outlet flume 42 of each tank and the inlet section 40 of the next adjacent downstream tank not only interconnect said tanks to each other in abutting relation, but at the same time cooperate to form a smooth, flush spillway over which water flows from one tank into the next. The releasable connection between adjacent tanks permits easy disassembly of the system when it is desired to clean and/or repair individual tanks, it being understood that if one tank becomes broken or malfunctions for any reason, that tank can simply be removed and the tanks on either side of it quickly interconnected to each other whereby the overall system remains operative. In addition, the varied configurations of the base members provides a wide variety of interesting water flow patterns and pools in which the fish may swim, it having been observed that not only will the fish swim from one pool to another within a single tank, but also the fish will swim through the water passing over the flume from one tank to the next in either a downstream or upstream direction. In other words, the downstream flow from one tank to the next is not so strong as to preclude fish from swimming against the flow direction from one tank to the next adjacent upstream tank. Obviously the fish can easily swim from one tank to the next in a downstream direction. The interchanging of the fish from one tank to the next, in either direction, and the activities of the fish in the pool or pools located within each individual tank provide great amusement and an excellent opportunity to observe fish activity and mannerisms.

Figure 8:
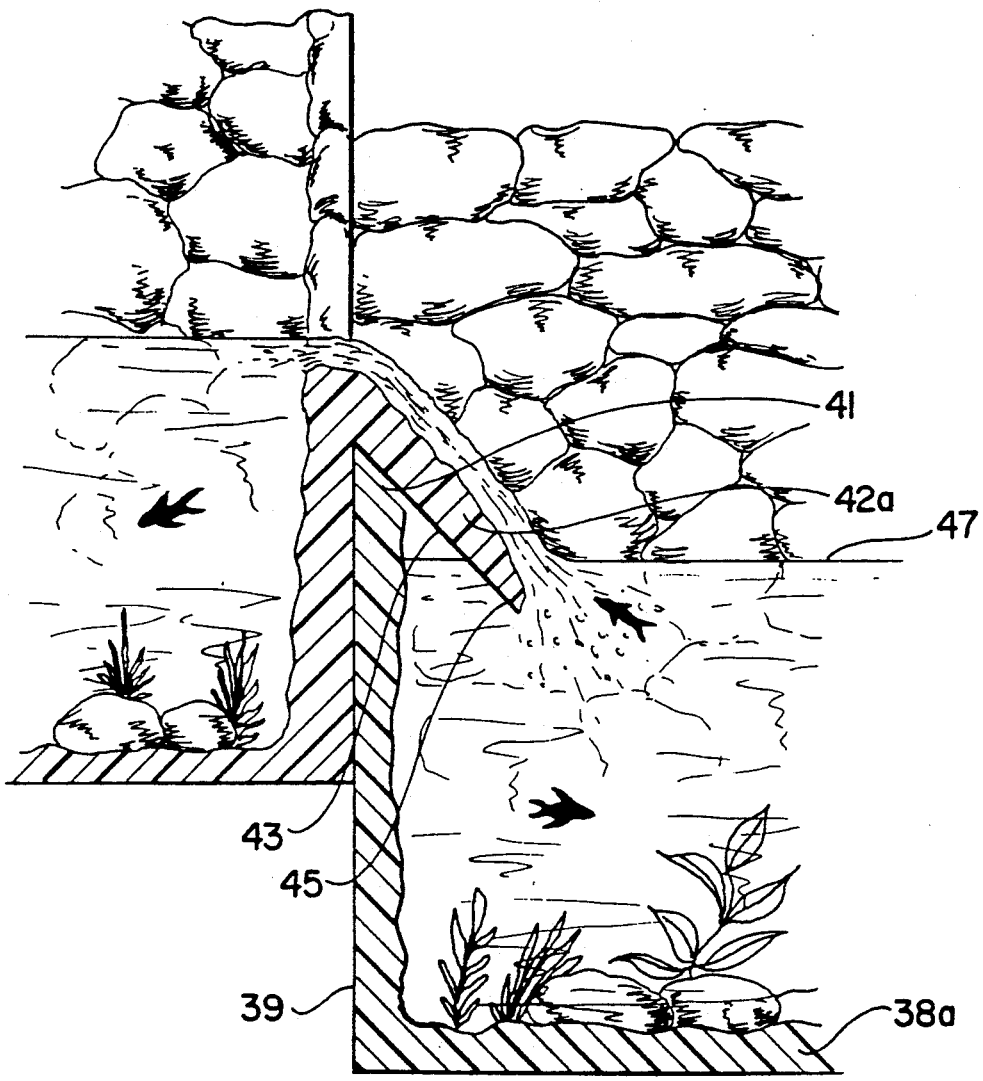
FIG. 8 is a sectional view similar to that of FIG. 4 showing a modified form of the invention.

FIG. 8 illustrates a modified assembly wherein there is no physical interconnection between outlet flume 42a and the tank into which it extends. In this embodiment, base member 38a merges at its upstream end with upwardly extending wall 39 terminating in beveled edge 41 over which flume 42a extends. The bottom surface 43 of flume 42a may be slightly elevated with respect to edge 41, as shown in FIG. 8, although, alternatively, surface 43 may rest on edge 41. In either case, flume 42a extends downwardly into the next adjacent downstream tank, with the lower end 45 of flume 42a terminating adjacent the water level 47 in said tank, and preferably slightly therebelow, although the flume will function properly even if it terminates slightly above said water level. In this embodiment of my invention, water flows downstream from one tank to the next via the flumes 42a in exactly the same manner as it does in the embodiment illustrated in FIG. 4, and fish can swim from one tank to the next, both upstream and downstream, as hereinbefore described, even where flume 42a terminates slightly above the water level 47, because the fish have sufficient dexterity to jump upwardly through any small air space that may exist between the lower end of the flume and the water level.

Since in this embodiment there is no physical interconnection between the flume and the tank into which it extends, each tank in the assembly must necessarily be secured to a wall surface to maintain the series of tanks in proper relation to each other.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An aquarium system comprising a plurality of discrete tanks, means mounting said tanks in stepped, gradually descending relation to each other whereby water introduced to the uppermost tank flows therethrough and then down into and through each succeeding tank, each tank having a base member comprising an inlet section located adjacent the tank upstream end, and an outlet flume extending outwardly from the tank downstream end, said flumes each extending over the inlet section of the next succeeding tank and then downwardly into the interior of said next succeeding tank, terminating at a point adjacent the water level of said next succeeding tank, whereby fish may swim from one tank to the next in either a downstream or upstream direction.

2. In the aquarium system of claim 1, at least some of said flumes terminating beneath the water level of the next succeeding tank.

3. In the aquarium system of claim 1, said inlet sections each comprising an open portion in the upstream end of each tank through which the outlet flume of the next adjacent upstream tank extends, the lower edge of said open portion being closely adjacent to the bottom surface of said outlet flume.

4. In the aquarium system of claim 3, said outlet flume bottom surface being in engagement with said open portion lower edge.

5. The aquarium system of claim 1 further characterized in that a first group of said tanks extend downwardly in a first direction, the lowermost of said tanks having means for switching back the water flow to the opposite direction, and a second group of said tanks extending downwardly from said switch-back tank in the opposite direction.

6. The aquarium system of claim 1 further characterized in that a first group of said tanks extend downwardly along a first wall surface, the lowermost of said tanks being a corner tank that has a portion in engagement with said first wall surface and a portion in engagement with a second wall surface extending angularly from said first wall surface, and a second group of said tanks extending downwardly from said corner tank along said second wall surface.

7. A fish aquarium comprising a tank of generally rectangular configuration having a base member mounted therein, said base member being configured so as to define a plurality of discrete pools having sequentially arranged descending water levels, means for continuously introducing water to the highest level pool whereby water flows and spills over from one pool to the next until water has reached and filled the lowest level pool and spilled over therefrom, and means recirculating the water spilling over from the lowest level pool for re-introduction to said highest level pool.

8. The aquarium of claim 7 further characterized in that said base member makes sealing engagement with the front wall of said tank, whereby said front wall cooperates with said base member to define said pools, said front wall being transparent so that fish swimming in said pools, and from one pool to the next, can be readily observed through said front wall.

* * * * *